US006995770B2

(12) United States Patent
Ngai

(10) Patent No.: US 6,995,770 B2
(45) Date of Patent: Feb. 7, 2006

(54) COMMAND LIST CONTROLLER FOR CONTROLLING HARDWARE BASED ON AN INSTRUCTION RECEIVED FROM A CENTRAL PROCESSING UNIT

(75) Inventor: Chuck H. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 10/226,679

(22) Filed: Aug. 22, 2002

(65) Prior Publication Data

US 2004/0036690 A1 Feb. 26, 2004

(51) Int. Cl.
*G06T 1/00* (2006.01)

(52) U.S. Cl. ...................... 345/522; 345/520; 345/553; 345/558

(58) Field of Classification Search ................ 345/522, 345/553, 556, 558, 520, 504, 559, 538
See application file for complete search history.

(56) References Cited

U.S. PATENT DOCUMENTS

| | | | | |
|---|---|---|---|---|
| 5,481,276 A | | 1/1996 | Dickey et al. | |
| 5,655,114 A | * | 8/1997 | Taniai et al. | 712/233 |
| 5,754,750 A | | 5/1998 | Butterfield et al. | |
| 5,903,281 A | * | 5/1999 | Chen et al. | 345/504 |
| 5,936,640 A | | 8/1999 | Horan et al. | |
| 5,966,142 A | * | 10/1999 | Harkin | 345/522 |
| 6,037,951 A | | 3/2000 | Albers et al. | |
| 6,084,599 A | | 7/2000 | Nakatsuka et al. | |

* cited by examiner

*Primary Examiner*—Matthew C. Bella
*Assistant Examiner*—Hau Nguyen
(74) *Attorney, Agent, or Firm*—William H. Steinberg; Hoffman, Warnick & D'Alessandro LLC

(57) ABSTRACT

A command list controller for controlling hardware based on an instruction received from a central processing unit (CPU) is provided. Specifically, the controller of the present invention retrieves hardware and controller commands from memory based on one or more instructions received from the CPU. All hardware commands will be forwarded to the hardware for execution, while all controller commands will be executed by the controller. Controller commands that the controller of the present invention is capable of executing include, among others, event wait commands and sublist execution commands.

21 Claims, 4 Drawing Sheets

COMMAND LIST CONTROLLER FOR CONTROLLING HARDWARE BASED ON AN INSTRUCTION RECEIVED FROM A CENTRAL PROCESSING UNIT

BACKGROUND OF THE INVENTION

1. Field of the Invention

The present invention generally relates to a command list controller for controlling hardware based on one or more instructions received from a central processing unit (CPU). Specifically, the present invention relates to a command list controller that can execute event wait and sublist execution commands when controlling device hardware.

2. Background Art

In computer graphics applications, hardware such as an accelerator is typically used to assist in graphic rendering. Generally, a hardware accelerator comprises a bitBLT engine and a scaler, which will work under the instruction of a central processing unit (CPU). To generate an image on a screen, the CPU must be available to instruct the accelerator to perform the required steps. Unfortunately, instruction of the accelerator places a large burden on the CPU, which could cause system delays and errors. This is especially the case where the CPU is required to execute certain commands such as, among others, event wait and sublist execution. An event wait command allows execution of a subsequent command in a list of commands to be delayed until a predetermined event occurs. This is especially useful, for example, when attempting to synchronize the hardware units. A sublist execution command allows a sublist of commands to be executed for a predetermined count (e.g., number of steps). When the count has been reached, the sublist is terminated and the address after the last executed command is saved. If a branch to the sublist occurs at a later time, execution will continue from the saved address.

Since executing commands such as event wait and sublist execution could "consume" the CPU, the capability to off-load such functionality from the CPU could be a valuable asset. Heretofore, controllers have been provided to control various hardware units. No existing controller, however, allows execution of commands such as event wait and sublist execution to be off-loaded from a CPU. Moreover, no existing controller retrieves both hardware and controller commands from a memory based on an instruction(s) received from the CPU.

In view of the foregoing, there exists a need for a controller that is capable of off-loading instructions and functionality from a CPU. Moreover, a need exists for the controller to be able to receive an instruction from the CPU and retrieve corresponding commands from a memory. A further need exists for the controller to be able to execute retrieved controller commands such as event wait and sublist execution, while forwarding any hardware commands to the hardware.

SUMMARY OF THE INVENTION

In general, the present invention provides a command list controller for controlling hardware based on at least one instruction received from a CPU. Specifically, based on a base address and a list address, the controller will retrieve hardware and controller commands (i.e., data) from command list(s) within a memory. Once retrieved, the controller will implement any controller commands, while forwarding any hardware commands to the hardware. Under the present invention, the controller is capable of implementing, among other controller commands, event wait commands and sublist execution commands.

According to a first aspect of the present invention, a command list controller for controlling hardware based on an instruction received from a central processing unit (CPU) is provided. The controller comprises: (1) a first-in first-out (FIFO) for receiving commands from a memory; and (2) an event wait system for holding execution of a subsequent command when an event wait command is retrieved from the memory, wherein the subsequent command is held until a predetermined event occurs.

According to a second aspect of the present invention, a command list controller for controlling hardware based on an instruction received from a central processing unit (CPU) is provided. The controller comprises: (1) a first-in first-out (FIFO) for receiving commands from a memory; and (2) a sublist execution system for causing execution of a sublist of commands to terminate after a predetermined count is reached, and for saving a sublist address upon termination, when a sublist execution command is received from the memory.

According to a third aspect of the present invention, a command list controller for controlling hardware based on an instruction received from a central processing unit (CPU) is provided. The controller comprises: (1) a first-in first-out (FIFO) for receiving commands from a memory; (2) an event wait system for holding execution of a subsequent command when an event wait command is retrieved from the memory, wherein the subsequent command is held until a predetermined event occurs; and (3) a sublist execution system for causing execution of a sublist of commands to terminate after a predetermined count is reached, and for saving a sublist address upon termination, when a sublist execution command is received from the memory.

Therefore, the present invention provides a command list controller for controlling hardware based on an instruction received from a CPU.

BRIEF DESCRIPTION OF THE DRAWINGS

These and other features of this invention will be more readily understood from the following detailed description of the various aspects of the invention taken in conjunction with the accompanying drawings in which.

Figure 1:
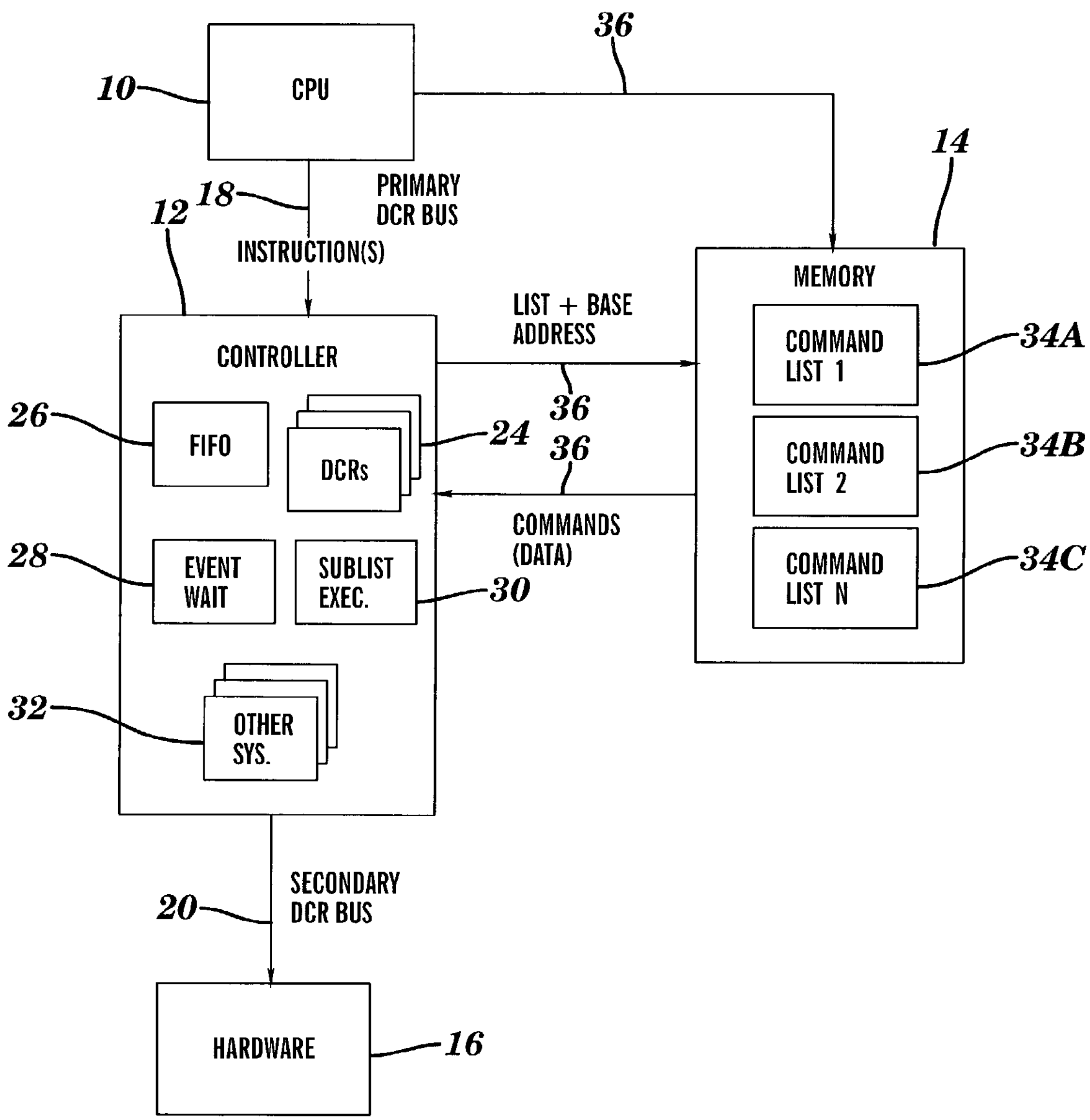
FIG. 1 depicts a command list controller controlling hardware based on one or more instructions received from a CPU according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a command list controller for controlling hardware based on instructions received from a central processing unit (CPU). Specifically, unlike previous controllers the controller of the present invention is provided with the capability to execute event wait commands and sublist execution commands as retrieved from a memory. It should be understood that although the present invention will be described in the context of controlling graphics hardware, it can be implemented to control any type of hardware.

Referring now to FIG. 1, a typical embodiment of the present invention is depicted. As shown, the present invention can be implemented in a PowerPC® architecture. Such architecture can be found in computer systems such as the R/S 6000, which is available from International Business Machines Corporation of Armonk, N.Y. It should be understood, however, that the architecture shown in FIG. 1 is intended to be exemplary only, and that the teachings of the present invention can be implemented in any known architecture. In general, CPU 10 will save commands to memory 14 via memory interface 36 in the form of command lists 34A–C. Once saved, CPU will communicate one or more instructions to command list controller (controller) 12 by writing data to device control registers (DCRs) 24. The data written generally includes a start bit, a base address, and a list address. The start bit turns the controller 12 "on," while the base address and the list address are added together to form a memory address. The memory address is the precise location within memory 14 of the pertinent command list 34A–C that is to be executed. Once located, the commands from the pertinent command list will be retrieved in order to first-in-first-out (FIFO) 26. In a typical embodiment, the commands are retrieved to FIFO 26 four at a time. However, it should be understood that the present invention can be programmed to retrieve any quantity of commands at a single time. FIFO 26 will then forward the commands in the order received. In forwarding the commands, any controller commands (i.e., commands that are meant to be executed by controller) will be forwarded to the appropriate system 28, 30 or 32 within controller 12 for execution. For example, if one of the commands in a four command set is an event wait command, the command will be forwarded to event wait system 28 for execution. Once forwarded, the command will be executed by writing the data therein to the appropriate DCRs 24. Conversely, any hardware commands (e.g., a graphic command) will be forwarded to hardware 16 for execution. Accordingly, controller 12 has the capability to differentiate between controller commands and hardware commands.

As further shown in FIG. 1 (and in accordance with the PowerPC® architecture), CPU 10 communicates with controller 12 via primary device control register (DCR) bus 18, while controller 12 communicates with hardware 16 via secondary DCR bus 20. Communication with memory 14 from controller 12 and CPU 10 occurs via memory controller 36. Memory 14 may comprise any known type of data storage and/or transmission media, including magnetic media, optical media, random access memory (RAM), read-only memory (ROM), a data cache, a data object, etc. Moreover, memory 14 may reside at a single physical location, comprising one or more types of data storage, or be distributed across a plurality of physical systems in various forms. CPU 10 may likewise comprise a single processing unit, or be distributed across one or more processing units in one or more locations, e.g., on a client and server. Memory controller 36 provides a communication link with memory 14 and typically includes separate ports for CPU 10 and controller 12. Primary DCR bus 18 and secondary DCR bus 20 provide a communication link between CPU 10, controller 12 and hardware 20 that allows data to be communicated according to the DCR bus format (which will be further described below in conjunction with FIG. 2). Moreover, as indicated above, hardware 16 can be graphics hardware. As such, hardware 16 could include hardware units such as a bitBLT (2D) engine and a scaler.

As indicated above, all commands to be executed (i.e., either by controller 12 and/or hardware 16) are programmed into memory as command lists 34A–C. As such, controller commands are embedded in the command lists 34A–C along with hardware commands. In a typical embodiment, the commands in command lists 34A–C are set forth by CPU 10 according to the DCR bus format. However, it should be understood that many other formats could be implemented and the DCR bus format is described herein for illustrative purposes only.

Figure 2:
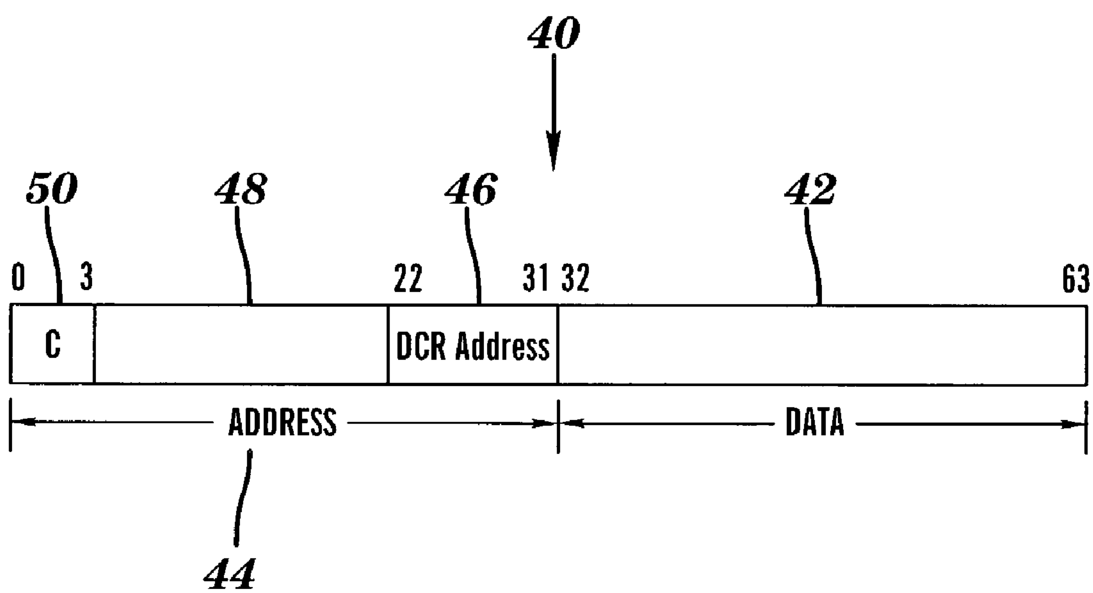
FIG. 2 depicts an exemplary command in a device control register (DCR) bus format according to the present invention.

Referring to FIG. 2, an exemplary command 40 in a DCR bus format is shown in greater detail. As depicted, command 40 is sixty-four bits (eight bytes) in length with thirty-two bits reserved as command bits 42 and thirty-two bits reserved as address bits 44. Within address bits 44 are ten DCR address bits 46, nineteen additional address bits 48 (e.g., for a description) and four character bits 50. DCR address bits 46 specify an address of a particular DCR 24 within controller 12 to which data in command bits 42 should be written. For example, one of the commands retrieved from memory 14 might be a sublist execution command. In this event, the data in the command bits 42 could indicate a list address of the sublist to be executed as well as a count. Such data would be written (by sublist execution system 30) to the appropriate DCRs 24 specified in the DCR address bits 46. Character bits 50 allows a character pattern to be arbitrarily defined. If controller 12 does not get the correct pattern, it will stop executing (i.e., turn off the start bit).

Unlike previous controllers, controller 12 (FIG. 1) has the capability to execute numerous controller commands. Such commands include, among other things, loop control, branching to subroutine and return, maskable conditional branch looping, execution wait and sublist execution. By providing controller 12 with the capability to perform such functions significant duty is off-loaded from CPU 10. As indicated above, execution of such commands relies upon writing data from retrieved commands to particular DCRs 24 within controller 12. As such, each command that controller 12 will execute will have at least one corresponding DCR 24. Writing to DCRs 24 is generally performed by systems 28, 30 or 32, depending on the command being executed. For example, event wait system 28 will write to the event wait DCRs 24 to execute an event wait command, while sublist execution system 30 will write to the sublist execution DCRs 24 to execute a sublist execution command. Other systems 32 are shown to illustrate the other commands (e.g., branching to subroutine and return, etc.) that can be executed by controller 12.

Figure 3:
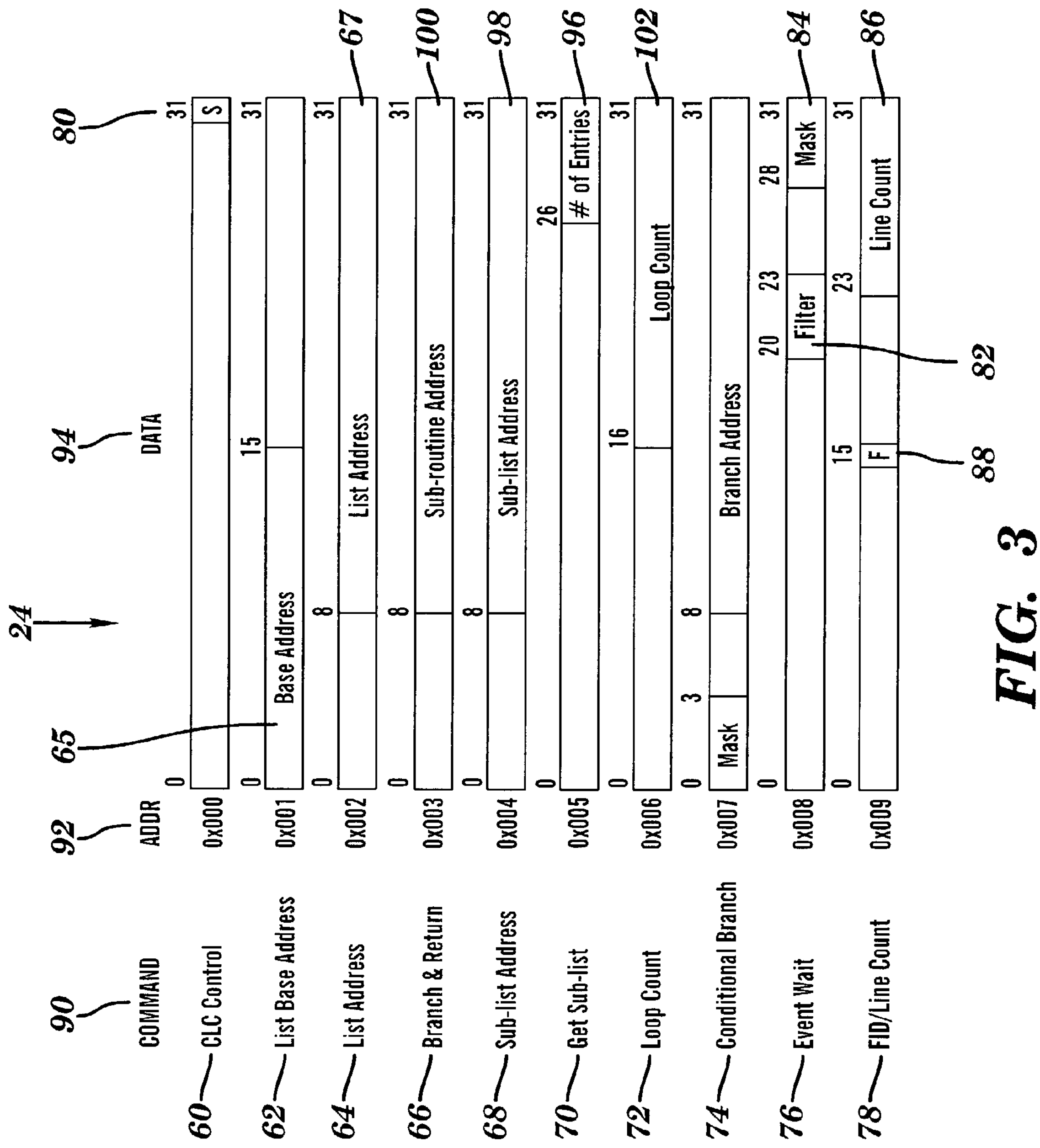
FIG. 3 depicts exemplary device control registers (DCRs) according to the present invention.

Referring now to FIG. 3, exemplary DCRs 24 according to the present invention are shown in greater detail. As depicted DCRs 24 each include command description field 90, DCR address field 92 and data field 94. Command description field 90 provides a description of the command to which each DCR pertains. DCR address field 92 provides the address of each register within the array of DCRs. This ensures that data will not be written to the wrong DCR. Data field 94 is where data from retrieved commands will be written to affect execution of a corresponding command.

CLC control register 60 is written to by CPU to turn on controller 12. Specifically, CPU will write a start bit 80 to begin execution. When this bit is set to "1," controller 12 will begin to retrieve commands from memory 14. The CPU can turn "off" controller 12 by setting start bit 80 to "0." To begin retrieving commands from memory 14, CPU will send at least one (typically a plurality) of instructions to controller 12. The instruction(s) will: (1) set start bit 80 to "1"; (2) write the base address to base address field 65 of base address register 62; and (3) write the list address to list address field 67 of list address register 64. The two addresses (base and list) will then be added together to form a memory address that corresponds to a particular command list 34A–C. The commands from the corresponding command list will be retrieved to FIFO 26 as described above. Any hardware 16 commands (i.e., commands to be executed by hardware 16) will be forwarded to hardware 16, while any controller 12 commands (i.e., commands to be executed by controller 12) will be forwarded to the appropriate system 28, 30 or 32 for execution. As indicated above, the commands are typically stored in memory in DCR bus format as shown and described in conjunction with FIG. 2.

In accordance with the present invention, two commands that controller 12 is capable of executing are event wait and sublist execution. The event wait command is used to pace the execution of the retrieved commands. In a typical embodiment, four events can be selected to control the command execution. Such commands are field identification and line count match, line count match, graphic scaler busy and 2D engine busy. To execute the event wait command, event wait register 76 and FID/line count register 78 are used. Specifically, an event wait command will be retrieved from memory 14 (i.e., from the memory address resulting from the base address and list address as provided by CPU 10) and forwarded to event wait system 28. Event wait system 28 will then write the data in the command to event wait register 76 and FID/line count register 78 to cause execution of the command. In event wait register 76, four bit filter field 82 is used to select the polarity (busy vs. not busy, match vs. no match, etc.) for each of the four events. Four bit mask field 84 is used to select the actual events (i.e., turn on the event wait feature for each particular event). This allows a subsequent command to be held pending multiple events. If multiple events are turned "on," the result is an OR of all the selected events. FID/line count register 78 is used to set up the field identification and line count for the event matching. As shown, one bit field identification 88 and eight bit line count field 86 are shown. When an event wait command is retrieved from memory 14, the execution of a subsequent command will be held until the event(s) specified in the command occur. This not only helps synchronize the hardware units, but also gives hardware 16 ample time to complete execution of hardware 16 commands.

Listed below is a step by step example of execution of an event wait command under the present invention:

EXAMPLE

Assume that the following command list is stored at memory address 0x100A0000, wherein 0x10000000 is the base address and 0x000A0000 is the list address:

0x100A0000—Scaler command;

0x100A0001—Event Wait command;

0x100A0002—BitBLT command; and

0x100A0003—other subsequent commands.

(1) CPU writes 0x10000000 to DCR address 0x001 (base address register field 65);

(2) CPU writes 0x000A0000 to DCR address 0x002 (list address register field 67);

(3) CPU writes 0x00000001 to DCR address 0x000 (start bit 80);

(4) Controller starts retrieving commands (i.e., command data) from memory at memory address 0x100A0000 (the sum of list address and base address);

(5) Scaler command is started (it may take some time to complete);

(6) Event Wait command is detected and the filter and mask fields are loaded into event wait DCR 76;

(7) In this case, the filter and mask are programmed to wait for the scaler to be "not busy" for the controller to continue;

(8) The next command, BitBLT command, is on hold until the scaler status becomes not busy before it can be sent to the hardware unit; and This example shows the interlock and synchronization between the scaler unit and the bitBLT unit by using the Event Wait command.

Sublist execution commands can also be executed by controller 12. In general, sublist execution occurs when a sublist execution command is retrieved from memory 14 and forwarded to sublist execution system 30. Typically, the sublist execution command will includes a list address and a count. The list address is written to sublist address field 98 of sublist address register 68, and is added to the base address provided by CPU 10 to yield a sublist address. The count is written to entry field 96 of get sublist register 70. Once written, the sublist execution command instructs controller 12 to branch from a main list of commands currently being executed (e.g., command list 32A) to another list of commands (e.g., command list 32B) for a designated count (e.g., number of steps). When the count is up, the address after the last command executed in the sublist (or the address of the last command executed) is saved. Then, the next time a command to branch to the sublist is retrieved from memory, execution of the sublist will begin after the last command executed. This differs from basic subroutine execution in that each time a subroutine is branched to, execution will begin with the first command in the subroutine, not where the subroutine previously left off. Listed below is a step by step example of execution of a sublist execution command under the present invention:

EXAMPLE

Assume that two command lists are stored in memory 14. One is the main command list at memory address 0x100A0000 and the other is the sublist command list at memory address 0x100A1000. Also assume that the length of the main command list is 0x1000 so that it will not overlap with the sublist command list. Both lists are based on the base address 0x10000000.

(1) CPU writes 0x10000000 to DCR address 0x001 (base address register field 65);

(2) CPU writes 0x000A0000 to DCR address 0x002 (list address field 67);

(3) CPU writes 0x00000001 to DCR address 0x000 (start bit 80);

(4) Controller starts retrieving commands (i.e., command data) from memory at memory address 0x100A0000 (the sum of list address and base address);

(5) Command execution of the main list starts;

(6) Sublist execution command is detected and passed to sublist execution system 30;

(7) Sublist execution system 30 writes 0x000A1000 to sublist address field 98 of sublist address register 68 to set up the starting address of the sublist execution (it is added to base address to yield a sublist memory address of 0x100A1000);

(8) Sublist execution system 30 writes the number of counts to entry field 96 of get sublist register 70;

(9) Controller starts the sublist execution by retrieving commands into the FIFO from memory address of 0x100A1000;

(10) The sublist address after the last command executed in the sublist is saved in the sublist address register 68;

(11) Controller returns to the main list;

(12) Execute more commands from the main list;

(13) Retrieve another sublist execution command;

(14) Execute sublist beginning with the address in the sub-list address register (i.e., after the last command previously executed); and

(15) Continue the main list command execution until the start bit is reset by a command.

It should be understood that the command list can be programmed to branch back to the beginning of the list. Thus, command execution can occur until CPU 10 turns the start bit "off." It should also be understood that as described herein, the address after the last command executed in a sublist is saved in sublist address register. However, it should be appreciated that the address of the last command executed could be saved. The important feature of sublist execution is that future execution of commands from the sublist begins where it left off (i.e., after the last command executed).

Other DCRs 24 shown in FIG. 3 include branch & return register 66, loop count register 72 and conditional branch register 74. Each of these DCRs 24 will be written to by other systems 32 to execute the commands pertaining thereto. Branch and return register 66 is used in response to a subroutine command. Specifically, when controller 12 receives a command to branch to another command list to perform a subroutine, the next list address in the main list is saved (prior to branching off). At the end of the subroutine, all thirty-two bits of subroutine address field 100 in branch & return register 66 should be set to "1." This indicates a return to the saved list address of the main command list.

Conditional branch register 74 is used in response to a conditional branch command. Specifically, the conditional branch command is used to branch to another location in the command list conditionally. In a typical embodiment, the maskable conditions are: (1) loop count not equal to "0"; (2) graphic scaler busy; (3) 2D engine busy; and (4) unconditional branch. Loop count register 72 is used to specify the number of times that a conditional branch command must be executed. Each time the conditional branch command is executed, the loop count in loop count field 102 of loop count register 72 will decrement by one. When the loop count is "0," the conditional branch command will fall through to the next command.

Figure 4:
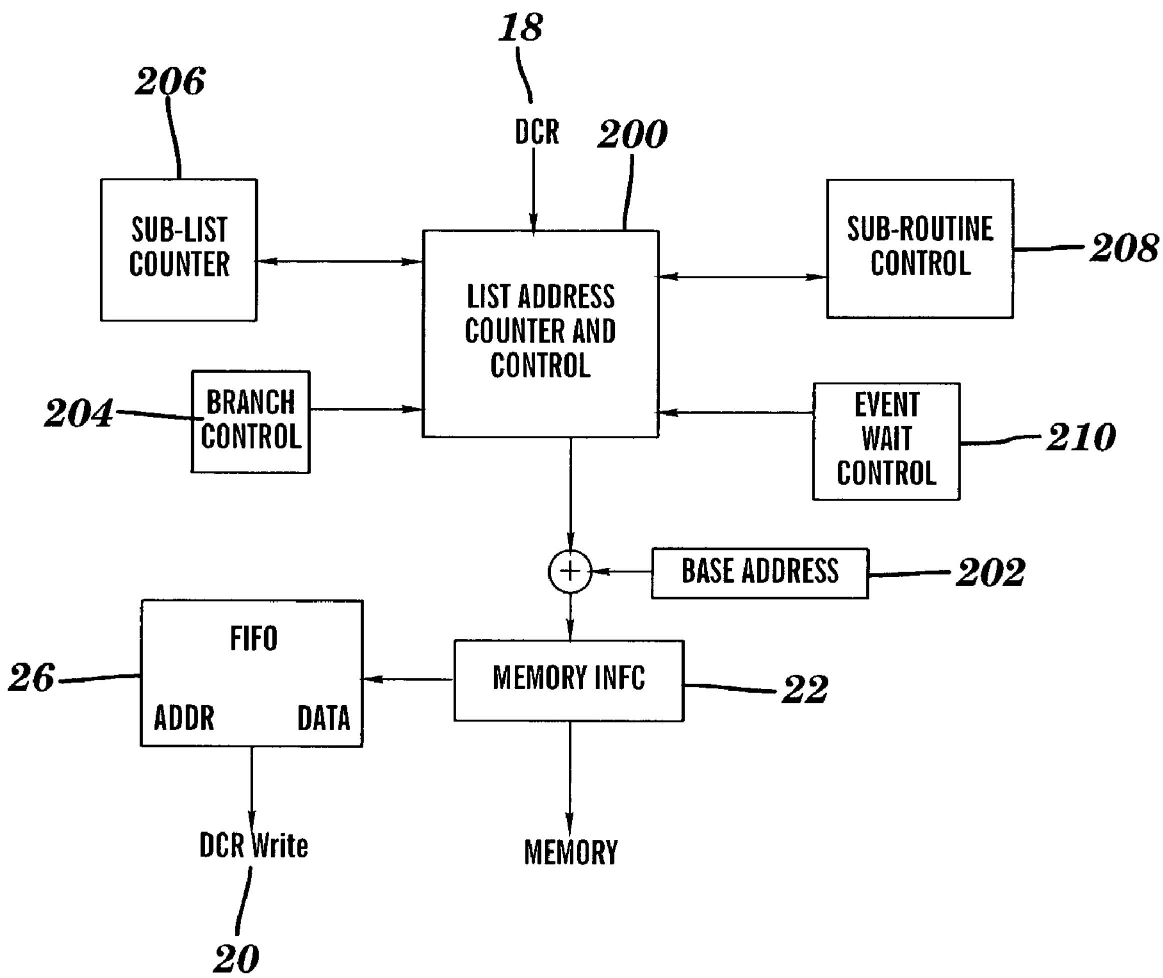
FIG. 4 depicts the flow of commands according to the present invention.

Referring now to FIG. 4, an exemplary flow diagram of commands is depicted. As indicated above, CPU 10 writes the list address to list address register 64 (FIG. 3), base address 202 to base address register 62 (FIG. 3) and sets the start bit in the CLC control register 60 (FIG. 3) through primary DCR bus 18. The controller reads the commands into FIFO 26 from the memory address in the memory via memory interface 22. When a command is for a subroutine branch, subroutine control 208 (e.g., part of a "other" subroutine system 32) will save the next list address in the branch & return register 66 for returning from the subroutine. Branch control 204 (e.g., part of a subroutine system, a conditional subroutine system and/or sublist execution system 30) allows execution of the commands in a sequence which is controlled by hardware 16 and the loop count. Sublist counter 206 (e.g., part of sublist execution system 30) keeps track of the number of commands executed after a branch to a sublist. When the count is up, the sublist address after the last command executed is saved before returning to the main list. For the next branch to the sublist, execution will begin from the saved sublist address. If a command requires a hardware unit to be available or the data to be synchronized, the even wait command is used via event wait control 210 (e.g., part of a event wait system 28) to hold execution of the next command until the condition is met (i.e., the event occurs). Although the event can be anything, examples cited herein include field ID, line count in a field, bitBLT engine busy and scaler busy.

It is understood that the present invention can be realized in hardware, software, or a combination of hardware and software. Any kind of system(s)—or other apparatus adapted for carrying out the methods described herein—is suited. For example, it is understood that systems 28, 30 and 32 within controller for executing controller commands (e.g., writing to DCRs 24) could include hardware, software or a combination thereof. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A command list controller for controlling hardware based on an instruction received from a central processing unit (CPU), comprising:

a first-in first-out (FIFO) for receiving commands from a memory; and a predetermined event that is external to an event wait command without accessing the CPU when the event wait command is retrieved from the memory event occurs.

2. The controller of claim 1, further comprising a sublist execution system for causing execution of a sublist of commands that is separate from the commands to terminate after a predetermined count of executed sublist commands is reached, and for saving a sublist address upon termination, when a sublist execution command is received from the memory.

3. The controller of claim 2, wherein the sublist execution system accesses a sublist address register and a get sublist register within the controller, and wherein the event wait system accesses an event wait register and a field ID/line count register within the controller.

4. The controller of claim 3, wherein the event wait register comprises a filter field for selecting a polarity of the predetermined event, and a mask field for selecting the predetermined event.

5. The controller of claim 1, wherein the FIFO forwards the commands to the hardware.

6. The controller of claim 1, wherein the CPU and controller communicate via a primary device control register (DCR) bus, and wherein the controller and the hardware communicate via a secondary DCR bus.

7. The controller of claim 1, wherein the instruction includes a start bit and a list address.

8. A command list controller for controlling hardware based on an instruction received from a central processing unit (CPU), comprising:

a first-in first-out (FIFO) for receiving commands from a memory; and a sublist execution system for causing execution of a sublist of commands that is separate from the commands to terminate after a predetermined count of executed sublist commands is reached, and for saving a sublist address upon termination, when a sublist execution command is received from the memory.

9. The controller of claim 8, further comprising an event wait system for holding execution of a subsequent command for a predetermined external event without accessing the CPU when an event wait command is retrieved from the memory, wherein the subsequent command is held in the FIFO until the predetermined event occurs.

10. The controller of claim 9, wherein the event wait system accesses an event wait register and a field ID/line count register within the controller, and wherein the sublist execution system accesses a sublist address register and a get sublist register within the controller.

11. The controller of claim 10, wherein the event wait register comprises a filter field for selecting a polarity of the predetermined event, and a mask field for selecting the predetermined event.

12. The controller of claim 8, wherein the FIFO forwards hardware commands to the hardware.

13. The controller of claim 8, wherein the CPU and controller communicate via a primary device control register (DCR) bus, and wherein the controller and the hardware communicate via a secondary DCR bus.

14. The controller of claim 8, wherein the instruction includes a start bit and a list address.

15. A command list controller for controlling hardware based on an instruction received from a central processing unit (CPU), comprising:

a first-in first-out (FIFO) for receiving commands from a memory;

a predetermined event that is external to an event wait command without accessing the CPU when the event wait command is retrieved from the memory event occurs; and a sublist execution system for causing execution of a sublist of commands that is separate from the commands to terminate after a predetermined count of executed sublist commands is reached, and for saving a sublist address upon termination, when a sublist execution command is received from the memory.

16. The controller of claim 15, wherein the FIFO forwards the commands to the hardware.

17. The controller of claim 15, wherein the CPU and controller communicate via a primary device control register (DCR) bus, and wherein the controller and the hardware communicate via a secondary DCR bus.

18. The controller of claim 15, wherein the instruction includes a start bit and a list address.

19. The controller of claim 15, wherein the event wait system accesses an event wait register and a field ID/line count register within the controller, and wherein the sublist execution system accesses a sublist address register and a get sublist register.

20. The controller of claim 19, wherein the event wait register comprises a filter field for selecting a polarity of the predetermined event, and a mask field for selecting the predetermined event.

21. A method for controlling hardware components in a computer system, the method comprising:

saving to memory by a central processing unit (CPU) via a first port of a memory controller a command list, the command list having at least one command in a device control register (DCR) bus format, the at least one command in the command list comprising a graphics hardware command and a controller command, each command being sixty-four bits in length with thirty-two bits reserved as command bits and thirty-two bits reserved as address bits, the address bits comprising ten DCR address bits that specify an address of a DCR to which data in the command bits should be written, four character bits that allow a character pattern to be arbitrarily defined and nineteen additional address bits;

communicating to a command list controller from the CPU via a primary DCR bus at least one instruction, by writing instruction data to at least one DCR of the command list controller, the instruction data including a start bit for turning on the command list controller, a base address, and a list address, wherein the base address and the list address are added together to form a memory address of the command list in the memory;

retrieving, from the memory to a first-in-first-out (FIFO) the at least one command of the command list via a second port of the memory controller, the at least one command being retrieved four at a time, the retrieval being based on the memory address formed from the base address and the list address; and forwarding a command of the at least one command, in an order received to an appropriate system for executing the command, the forwarding step further comprising:

if the command is a graphics hardware command, forwarding the command to graphics hardware for execution via a secondary DCR bus;

if the command is an event wait command, forwarding the command to an event wait system of the command list controller, the event wait system executing the command without accessing the CPU by writing the command bits to appropriate ones of the at least one DCR; and if the command is a sublist execution command, forwarding the command to a sublist execution system of the command list controller, the sublist execution system executing the command without accessing the CPU by writing a list address of the command bits and a count of the command bits to at least one sublist execution DCR specified in the DCR address bits;

if the command is an another controller command, executing the command without accessing the CPU by writing command data to appropriate ones of the at least one DCR; and if the command is a non-graphics hardware command, forwarding the command to a hardware component via the secondary DCR bus for execution;

wherein if the character pattern received by the command controller is not correct, the command controller stops executing;

wherein each DCR includes a command description field the provides a description of the command to which the DCR pertains, a DCR address field that provides an address of each register within the at least one DCR and a data field where data of a command is written to affect execution of the command;

wherein the event wait command allows execution of a subsequent command in a list of commands to be delayed until a predetermined event occurs; and wherein the sublist execution executes a sublist of commands for a predetermined count;

terminating execution of the sublist and saving an address after that of a last executed command when the predetermined count has been reached; and continuing execution from the saved address if a subsequent branch to the sublist occurs.

* * * * *